United States Patent
Wilson

(10) Patent No.: US 7,346,763 B2
(45) Date of Patent: Mar. 18, 2008

(54) PROCESSOR INSTRUCTION WITH REPEATED EXECUTION CODE

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 98 days.

(21) Appl. No.: 10/857,964

(22) Filed: Jun. 2, 2004

(65) Prior Publication Data
US 2005/0273582 A1    Dec. 8, 2005

(51) Int. Cl.
G06F 9/30    (2006.01)
G06F 9/34    (2006.01)

(52) U.S. Cl. ........................... 712/241; 712/208
(58) Field of Classification Search ............... 712/241, 712/208
See application file for complete search history.

(56) References Cited

U.S. PATENT DOCUMENTS

| | | | |
|---|---|---|---|
| 5,887,183 A | 3/1999 | Agarwal et al. | |
| 5,895,501 A | 4/1999 | Smith | |
| 5,940,876 A | 8/1999 | Pickett | |
| 6,530,012 B1 | 3/2003 | Wilson | |
| 6,553,486 B1 | 4/2003 | Ansari | |
| 7,093,103 B2 * | 8/2006 | Isomura | 712/7 |
| 2003/0074530 A1 | 4/2003 | Mahalingaiah et al. | |
| 2003/0074544 A1 | 4/2003 | Wilson | |
| 2003/0159023 A1 * | 8/2003 | Barlow et al. | 712/241 |
| 2004/0250090 A1 * | 12/2004 | Crispin et al. | 713/189 |
| 2005/0273576 A1 | 12/2005 | Wilson | |
| 2005/0273577 A1 | 12/2005 | Wilson | |

OTHER PUBLICATIONS

"Advanced Computer Architectures"; Sima et al; 1997; Addison-Wesley; p. 89-95, 175-179.*

* cited by examiner

Primary Examiner—Alford Kindred
Assistant Examiner—Benjamin P. Geib
(74) Attorney, Agent, or Firm—Sterne, Kessler, Goldstein & Fox P.L.L.C.

(57) ABSTRACT

The present invention relates to a design of a computer system that processes instructions with a specific operation code causing the processor to execute a certain operation twice and a method for running such computer system in a time and register space saving manner. A method is provided for executing at least one computer instruction which defines at least a first source operand and an operation to be carried out on the operand, the instruction containing at least one address field of a predetermined bit length and at least one repeated execution bit related to the first operand. The method includes accessing the first source operand; accessing the repeated execution bit and deriving from that repeated execution bit a repeated execution code defining a repeated execution condition; and selectively carrying out the operation defined in the instruction once, twice or more times in dependence of the repeated execution code. This method has the advantageous effect that in case an instruction shall be performed twice or more times, no separate or additional special instruction is necessary, thereby register space and the time for processing separate or additional logical instructions is saved.

9 Claims, 3 Drawing Sheets

PROCESSOR INSTRUCTION WITH REPEATED EXECUTION CODE

FIELD OF THE INVENTION

The present invention refers to the field of computer or microcomputer architecture. In particular, the present invention is related to the design or the definition of instruction sets for computers and microcomputers and to a method of conditionally executing computer instructions, a computer system and a computer program product. The invention also relates to a design of a computer system that processes instructions with a specific operation code causing the processor to execute a certain operation once or several times, especially twice or four times. Particularly, the present invention relates to methods for operating a computer system in which register addresses are generated with more than one execution channel controlled by one central processing unit.

BACKGROUND OF THE INVENTION

In computer systems it is conventional to define in each instruction to be executed a set of register addresses which are used to access a register file in the computer system. The register addresses usually include first and second register addresses defining registers from which operands are extracted and at least one destination register address defining a register into which the results of an operation are loaded. Data processing instructions generally use the contents of the first and second registers in some defined mathematical or logical manipulation and load the results of that manipulation into the defined destination register. Memory access instructions use the register addresses to define memory locations for loading and storing data to and from a data memory. In a load instruction, source registers define a memory location from which data is to be loaded into the destination register. In a store instruction, the source registers define a memory location into which data is to be stored from the destination register.

Some computer systems have more than one execution channel. In such computer systems, each execution channel has a number of functional units which can operate independently, whereas both execution channels can be in use simultaneously. In some cases the execution channels share a common register file. It is useful in such architectures to provide instructions which simultaneously instruct both execution channels to implement a function so as to speed up operation of the processor. In such a scenario, a so-called long instruction may have two instruction portions each intended for a particular execution channel. Each instruction portion needs to define the register addresses for use in the function to be performed by the execution channel for which it is intended. In some cases both instruction portions may wish to define associated or the same register addresses. In these situations a long instruction needs to define two sets of register addresses, one for each execution channel.

In such known computer systems with more than one execution channel, parallelism has been specified implicitly, for example with a sequence of instructions whose parallelism is extracted at run time in a superscalar architecture, or explicitly with wide instructions, e.g. long instruction words (LIW) or very long instruction words (VLIW) which are architecturally defined to execute a set of separate components together. These known methods have the backlash in common that they require a lot of instruction space.

It is an aim of the present invention to reduce the number of bits required in an instruction for accessing a register file, in particular in the context of multiple execution channels in a computer system. As another object of the present invention in case of a repeated execution of an operation the number of the respective instruction shall be reduced. These and other objects will become apparent in the detailed description of the invention and the drawings.

SUMMARY OF THE INVENTION

According to one aspect of the present invention there is provided a computer system including a decode unit for decoding instructions supplied to the decode unit from a program memory, wherein each instruction has at least one bit sequence defining a register address and at least one repeated execution bit; a register file having a plurality of registers each having the same predetermined bit capacity and addressable via at least two register address ports, one of the ports being associated with a first execution channel of the computer system and the other of the ports being associated with a second execution channel of the computer system; a first register address supply path for supplying the at least one bit sequence with the repeated execution bit in the instruction to the one register address port; and at least the first execution channel executing the instruction once, twice or more times in dependence of the logical value of the repeated execution bit.

According to another aspect of the present invention, there is provided a method of executing computer instructions words each of which define at least a first operand and an operation to be carried out on the operand, the instruction containing at least one address field of a predetermined bit length and at least one repeated execution bit related to the first operand, the method comprising: accessing the first operand; accessing the repeated execution bit and deriving from that repeated execution bit a repeated execution code defining a repeated execution condition; and selectively carrying out the operation defined in the instruction once, twice or more times in dependence of the repeated execution code.

The invention further provides a computer system for conditionally carrying out an operation defined in a computer instruction, the computer system comprising: fetch and decoding circuitry for fetching and decoding a sequence of instructions from a program memory; at least one execution unit for conditionally executing the instructions and including means for accessing a repeated execution bit; an execution code register for holding a set of condition codes used in determining whether or not the instruction is to be executed and to determine whether the instruction is to be executed once, twice or more times.

The invention further provides a computer program product comprising program code means in the form of a sequence of computer instructions each of which define first and second operands and an operation to be carried out on the operands, each instruction further including an address field of a predetermined bit length and at least one repeated execution bit, the computer program product being loadable into a computer system and cooperating with the computer system to cause the repeated execution bit to be accessed, a repeated execution condition held in the repeated execution bit to be checked, and the operation defined in the instruction to be selectively carried out in dependence of the repeated execution condition.

DESCRIPTION OF THE PREFERRED EMBODIMENTS

Figure 1:
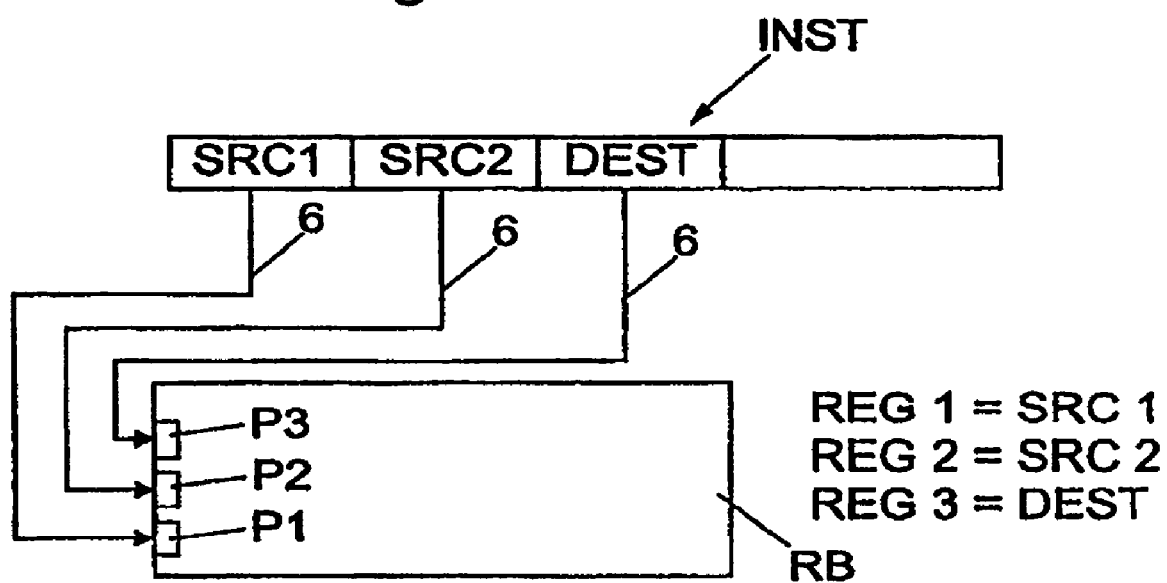
FIG. 1 is a schematic diagram illustrating a known register access system.

Before describing a particular implementation of the present invention first the principle function of a register access system will be discussed with reference to FIG. 1. FIG. 1 illustrates an instruction INST which has a number of fields including three register addressing fields which are labelled SRC1, SRC2 and DEST to denote the fact that they are intended to address first and second source registers and a destination register, respectively. In the described embodiment each field is a bit sequence having a length of six bits. FIG. 1 illustrates schematically the situation where each register address is supplied to respective address ports P1 to P3 respectively of a register bank RB to address the required registers. Each address port P1 to P3 of the register bank RB receives a six bit address, and each address field has a length of six bits. In FIG. 1, a first register REG1 will be addressed by the first source register address SRC1, and second register REG2 will be addressed by the second source register address SRC2 and a third register REG3 will be addressed by the destination address DEST.

Figure 2:
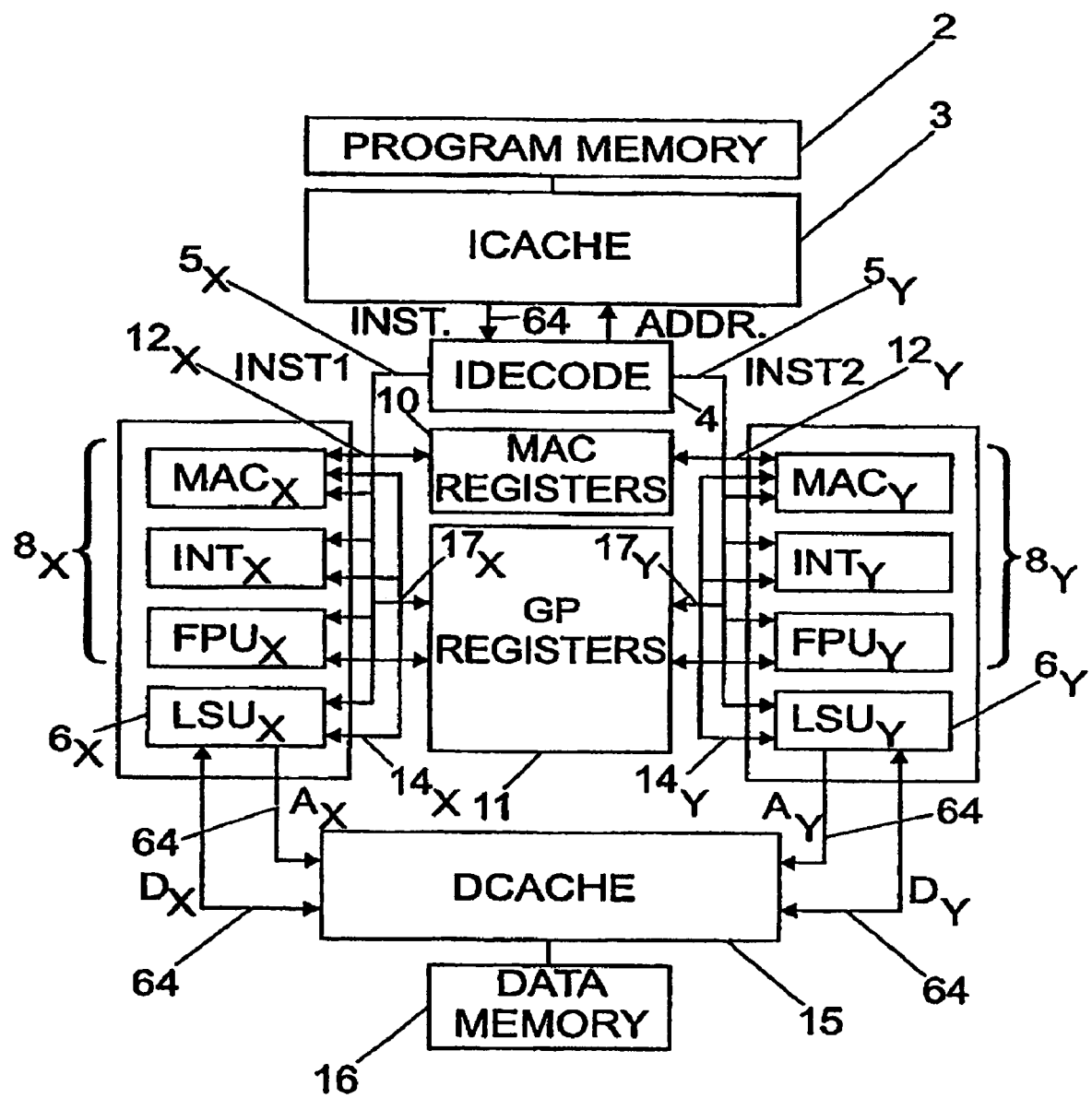
FIG. 2 is a schematic block diagram illustrating a processor capable of performing the present invention; and, FIG. 3 is a diagram illustrating the encoding of two "packed" instructions.
Figure 3:
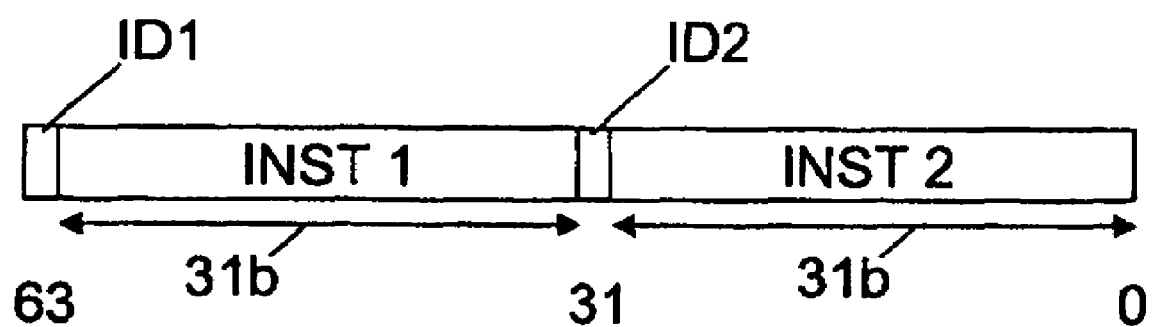

The computer system described herein is a repeated instruction stream, multiple data (DIMD) stream machine which normally executes two instructions every cycle. FIG. 2 is a schematic diagram of a system capable of performing the present invention. In FIG. 2, reference numeral 2 denotes a program memory which holds programs in the form of a plurality of instructions. In the normal mode of operation, each 64 bit instruction in the program memory allows two 31 bit operations to be defined in the manner illustrated in FIG. 3. That is, each 64 bit instruction contains two 31 bit instruction portions labelled INST1 and INST2. Each instruction portion has associated with it a single bit which identifies the type of instruction. These are denoted ID1 and ID2 in FIG. 3, standing for identification bits. An instruction portion can identify a data processing (DP) operation or a load/store (LD/ST) operation as will be explained more fully hereinafter. In one variant, the allowed combinations are two data processing operations (ID1, ID2 both set to "0"), two load/store operations (ID1, ID2 both set to "1") or one data processing and one load store operation (ID1=0, ID2=1).

The program memory 2 is connected to an instruction cache 3 which is connected to instruction fetch/decode circuitry 4. The fetch/decode circuitry issues addresses to the program memory and receives 64 bit lines from the program memory 2 (or cache 3), evaluates the operation code (op-code) and transmits the respective instructions INST1, INST2 along X and Y channels $5_x$, $5_y$. Each channel comprises a SIMD execution unit $8_x$, $8_y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

(B)—8 bit objects ($b_0 \ldots b_7$)
(H)—16 bit objects ($h_0 \ldots h_3$)
(W)—32 bit objects ($w_0 \ldots w_1$)
(L)—64 bit objects (l)
(S)—32 bit floating point
(D)—64 bit floating point For each channel $5_x$, $5_y$ if the instruction is a data processing instruction it is supplied to the appropriate data processing unit MAC, INT or FPU and if it is a load/store instruction it is supplied to the load/store unit LSU. Data values are loaded to and from the MAC data processing units into and out of a common register file 10 which includes sixteen 64 bit special purpose registers along register access paths $12_x$, $12_y$. Data values are loaded to and from the INT and FPU data processing units and the load/store units LSU into and out of a second register file 11 which includes sixty-four 64-bit general purpose registers. Register access paths $14_x$, $14_y$ are provided for these accesses. The program counter PC which indicates the current instruction can be read via one of the general purpose registers. Another one of the general purpose registers constitutes a control and status register.

Each register access path $17_x$, $17_y$ carries three addresses from the accessing unit, two source addresses SRC1, SRC2 and a destination address DST. In the case of data processing instructions, the source addresses SRC1, SRC2 define registers in the register files 10, 11 which hold source operands for processing by the data processing unit. The destination address DST identifies a destination register into which a result of data processing will be placed. The operands and results are conveyed between the register file 10 or 11 and the respective data processing unit via the access paths $17_x$, $17_y$. In the case of load/store instructions, the instruction formats allow memory access addresses $A_x$, $A_y$ to be formulated from data values held in the registers as described later. The load store units access a common address space in the form of a data memory 16 via a dual ported data cache DCACHE 15. For this purpose, each load/store unit has a 64 bit data bus $D_x$, $D_y$ and a 64 bit address bus $A_x$, $A_y$. Each load/store unit $6_x$, $6_y$ can execute a number of different memory access (load/store) instructions.

According to a first class of memory access instructions, an object is loaded into a destination register specified in the instruction (in the DST field) from an address read from a source register in the instruction (in the BASE REG field). The length of the object depends on the SIMD lane B, H, W or L specified in the instruction operation code. If the object length is less than 64 bits, the upper bits of the destination register are filled with zeros. This class of instruction also allows the number of objects to be specified. The memory address is read from the source register in the register file 11 by the specified load/store unit $6_x$, $6_y$ and despatched to the cache 15 via the appropriate address bus $A_x$, $A_y$. The object or objects are returned along the data bus $D_x$ or $D_y$ and loaded into the destination register of the register file 10 by the load/store unit. As is well known, on a cache miss, an access to the data memory 16 may be needed.

For each of the load instructions in the first class, there are matching store instructions. In each case, a single address is sent by each load/store unit and a single data value is returned at that address. That data value can constitute a number of objects depending on the number specified in the instruction and the length specified in the SIMD lane of the instruction. One such load instruction allows two long words to be loaded from two adjacent addresses in the data memory 16 from a base address in a first source register with an offset given in a second source register. Each register address field can address the same register or paired registers as defined above. If the same register address is generated, it will be used to address that register from different sides of the machine in accordance with the operational requirement of the instruction INST1 or INST2 being effected on that side of the machine.

The architecture of the above described computer system supports two types of instruction, so called "long instructions" and "dual operation instructions". Each 64 bit paired operation instruction defines two 31 bit operations in the manner illustrated in FIG. 3. That is, each 64 bit sequence contains two 32 bit instruction portions labelled INST1 and INST2. Each instruction also includes a designated set of identification bits which identify the type of each operation. There are two such bits in FIG. 3 at bit locations 31 and 63 denoted ID1 and ID2 in FIG. 3. In this embodiment operations are divided into data processing (DP) types or a load/store (LD/ST) types. The allowed combinations are two data processing operations (ID1,ID2 both set to "0"), two load/store operations (ID1,ID2 both set to "1") or one data processing and one load/store operation (ID1=0,ID2=1).

It is now understood that the above described computer device is capable of running instructions on two identical pipelines in form of parallel instructions with the register fields modified, i.e. using special instructions which enable the device to co-execute instructions. Such parallel instruction is represented at assembly language level by the mnemonic with a 2 added, e.g. if LDL is load long, then LDL2 is load long dualled and loads two longs using two load store pipelines where the register addressing is modified on the second pipeline. This prior method, which this invention extends upon, designated a few special instructions (LDL2, STL2) which caused instructions co-executing with them to become dual executed instructions. Thereby, the possibility is provided for the programmer to explicitly specify the parallel operation without using more register space. However, this known method leads to problems in terms of what instructions were actually permitted to be alongside LDL2/STL2 and a restriction in what programmers could express. For instance, the programmer could not define ADD2: MUL2, i.e. the duals of ADD and MUL paired with each other in one LIW instruction, since one needed an LDL2/STL2 to signal dualling.

Known methods for running the above described computer device do not provide the possibility of repeated execution of one or more operations by using the same instruction according to the present invention by means of repeated execution bits defined throughout the instruction set, wherein only a single repeated execution bit repeats the execution of the associated instruction. Computer devices can be run with extended length operations which function which are special instructions, e.g. the lengths go Byte, Half, Word, Long, Double Long. In contrast to this, the repeated execution bit according to the present invention provides for the effect on all operations.

Computer architectures have restrictions due to the LIW format. In the previous method for running computer processors separate instructions are used that cause the processor to perform the respective operation twice. According to one variant of the present invention, in case the repeated execution bit is set to a logical 1, the instruction contained in the respective instruction word is carried out by the processor twice. In case the repeated execution bit is set to a logical 0, the instruction contained in the respective instruction word is carried out by the processor only once. This has the advantageous effect that in case an instruction shall be performed twice, no separate or additional special instruction is necessary, thereby register space and the time for processing separate or additional special instructions is saved. The repeated execution bit does not elongate the instruction word. If, for instance, the instruction word has a length of 6 bits, the address field comprises 5 bits and the repeated execution bit is the $6^{th}$ bit of the instruction. In case the instruction shall be executed twice, the bottom bit of the instruction which is the repeated execution bit is set to a logical 1 which causes the processor to execute the instruction twice.

According to the present invention, there is a specific place in the instruction word defined as repeated execution bit. Usually the processor is capable to handle long instruction words (LIW) with both 64 bit and 28 bit formats. Such long instruction words contain two instructions or operations X and Y. According to another aspect of the present invention the repeated execution bits for each operation X and Y are preferably the bits in the middle of the respective instruction word. In the long instruction word preferably the bits number 32 and 33 are reserved for the repeated execution bits, i.e. the bit number 32 is reserved for the repeated execution bit referring to the first instruction X the bit number 33 is reserved for the repeated execution bit referring to the second instruction Y. Thus, the repeated me bit is present in each instruction and results in more operations being decoded and passed to the computer system for execution.

In scalar 32 bit, LIW 64 bit and VLIW 128 bit instructions, the operation itself is usually encoded in a 30 bit field. The remaining bits in the LIW 64 bit and VLIW 128 bit instructions contain the repeated execution bit, i.e. in the LIW 64 bit format the bits number 32 and 33 contain the repeated execution bit.

Thus, the 64 bit LIW format is:

<OpX:30><d1><d0><OpY:30><11> wherein OPX and OPY designates operations to be executed and d0 and d1 designates the associated repeated execution bit causing the respective operation to be executed once, twice or more times in dependence of the logical value of the respective repeated execution bit. In accordance with the present invention it is thereby possible to express 4, 3 and 2 combinations in the 64 bit format and between 8 and 4 in the 28 format. If the bit number 32 is set to a logical 0 and the bit number 33 is set to a logical 0 the first instruction X is carried out once and the second instruction Y is carried out once, so that two operations are carried out. If, for instance, the bit number 32 is set to a logical 1 and the bit number 33 is set to a logical 0 the first instruction X is carried out twice and the second instruction Y is carried out once, so that three operations are carried out. If the bit number 32 is set to a logical 1 and the bit number 33 is set to a logical 1, too, both the first and second instruction X and Y are carried out twice, so that all together four operations are carried out.

In one variant of the present invention, two repeated execution bits (bits 0 and 1) are used in an instruction set to signal the main operation code size encoding the lengths 16 bits, 32 bits, 64 bits or 128 bits. For the other formats, the main operation code size is either 48, 64 or 128 bits, encoded by bits number 32 and 33.

As mentioned above, there are also processors capable of handling very long instruction words (VLIW) with 128 bits, which can contain four different instructions or operations OP0, OP1, OP2, and OP3. In a very long instruction each operation OP0, OP1, OP2, and OP3 has an associated repeated execution bit. Depending on the setting of the repeated execution bits the operations OP0, OP1, OP2, and OP3 contained in the very long instruction word can be carried out once, twice or more times, respectively. In the 128 bit very long instruction word format the bits number 64 and 65, 96 and 97 contain the repeated execution bits.

Thus, the 128 bit VLIW format is:

<Op3:30><d3><d2><Op2:30><d1><d0><Op1: 30><10><Op0:30><01> wherein OP0, OP1, OP2 and OP3 designate operations to be executed and d0, d1, d2, and d3 designate the associated repeated execution bit causing the associated operation to be executed once, twice or more times in dependence of the logical value of the respective repeated execution bit. Depending on the setting of the repeated execution bit the operations X and Y contained in the respective instruction word can be carried out once, twice or more times. Accordingly, the new Instruction specification of the present invention allows to specify up to 8 operations in the 128 bit format, i.e. from 4 operations in case each operation OP0, OP1, OP2 and OP3 is carried out only once up to 8 operations in case each operation OP0, OP1, OP2 and OP3 is carried out twice.

The present invention is applicable in variable length instruction schemes and provides the advantages of a consistent specification for executing a certain operation once, twice or more times throughout one instruction set regardless of the instruction format. Furthermore, the present invention provides a basis to save register space and enhancement of the processor performance. In still another aspect of the present invention, the management of the registers can be performed more efficiently in a time saving manner, since it is possible to have all necessary information of an instruction set available simultaneously avoiding the process of adding one bit to a register field, thereby saving the time it would take for a logical operation. The register addressing can be performed taking the bits of the register field directly to the first operation in a first register field, and in a second operation the top five bits of the register field are taken and forwarded to a second register field while the bottom bit is replaced or set to a logical one representing the repeated execution bit.

In another variant, bit number 31 of the operation is the repeated execution bit. This implementation applies to a computer system which dynamically determines one or two operations per instruction, wherein bit number 31 of the single operation per instruction format would allow the repeatedly execution of the respective operation, or bits 31 and 63 of the two operations per instruction format would independently allow each operation to be repeatedly executed.

What is claimed is:

1. A computer system comprising: a decode unit for decoding instructions having dual operations, wherein said instructions are supplied to the decode unit from a program memory, wherein an instruction has at least one bit sequence defining a register address and at least one repeated execution bit; a register file having a plurality of registers each having the same predetermined bit capacity and addressable via at least two register address ports, one of the ports being associated with a first execution channel of the computer system and the other of the ports being associated with a second execution channel of the computer system, wherein the first execution channel executes a first operation of the instruction and the second execution channel executes a second operation of the instruction in parallel with the first operation; a first register address supply path for supplying the at least one bit sequence with the repeated execution bit in the instruction to the one register address port; and at least the first execution channel executing the first operation once, twice or more times in dependence of the logical value of the repeated execution bit.

2. A computer system according to claim 1, further comprising a second register address supply path for supplying the bit sequence with the repeated execution bit in the instruction to the other register address port; and the second execution channel executing the second operation once, twice or more times in dependence of the logical value of the repeated execution bit.

3. A computer system according to claim 1, wherein the first register address supply path supplying the at least one bit sequence with a first repeated execution bit in the first operation to the one register address port; and a second register address supply path for supplying the bit sequence with a second repeated execution bit in the second operation to the other register address port; the first execution channel executing the first operation once, twice or more times in dependence of the logical value of the first repeated execution bit; and the second execution channel executing the second operation once, twice or more times in dependence of the logical value of the second repeated execution bit.

4. A computer system according to claim 1, wherein the respective execution channel executing the first and/or second operation once, if the repeated execution bit has a logical zero value; and the respective execution channel executing the first and/or second operation twice if the repeated execution bit has a logical one value.

5. A computer system according to claim 1, wherein the repeated execution bit is identified in the address field of the instruction or the repeated execution bit is the bottom bit of the instruction word.

6. A computer system according to claim 1, wherein the repeated execution bits for each operation are the bits in the middle of the respective instruction.

7. A computer system according to claim 1, wherein the instruction is a 64 bit format instruction word (LIW) and the bits numbers 32 and 33 are reserved for the repeated execution bits.

8. A computer system according to claim 7, wherein the bit number 32 is reserved for the repeated execution bit referring to the first operation, and the bit number 33 is reserved for the repeated execution bit referring to the second operation.

9. A computer system according to claim 1, wherein the instruction word is a 128 bit format instruction word (VLIW) and the bits numbers 64 and 65, 96 and 97 contain repeated execution bits.

* * * * *